United States Patent [19]
Lim et al.

[11] Patent Number: 6,164,614
[45] Date of Patent: Dec. 26, 2000

[54] MOUNTING FRAME USING AN OPERATING VIBRATION DAMPER AT A RECESSED SIDE SURFACE OF A DISC DRIVE HOUSING

[75] Inventors: Choon Kiat Lim; Joseph Cheng-Tsu Liu; Kok Tong Soh; Wai Onn Chee, all of Singapore, Singapore

[73] Assignee: Seagate Technology LLC, Scotts Valley, Calif.

[21] Appl. No.: 09/543,134

[22] Filed: Apr. 5, 2000

Related U.S. Application Data

[62] Division of application No. 09/086,357, May 28, 1998, abandoned.
[60] Provisional application No. 60/064,818, Nov. 7, 1997.
[51] Int. Cl.[7] .............................. F16M 13/00; F16M 1/00; F16M 11/00; F16M 3/00; F16M 5/00
[52] U.S. Cl. ............................................. 248/634; 248/638
[58] Field of Search ...................................... 248/634, 638; 361/685; 360/97.01

[56] References Cited

U.S. PATENT DOCUMENTS

| | | |
|---|---|---|
| 2,303,233 | 11/1942 | Schrak ..................................... 248/638 |
| 4,711,423 | 12/1987 | Popper ..................................... 248/638 |
| 4,713,714 | 12/1987 | Gatti et al. .............................. 248/638 |
| 5,463,527 | 10/1995 | Hager et al. ............................. 361/685 |
| 5,464,187 | 11/1995 | Linkner, Jr. ............................. 248/638 |
| 5,488,538 | 1/1996 | Wakita .................................... 361/685 |
| 5,668,697 | 9/1997 | Dowdy .................................... 361/685 |
| 5,677,811 | 10/1997 | Kuno et al. .......................... 360/97.01 |
| 5,740,011 | 4/1998 | Kobayashi et al. ..................... 361/685 |
| 5,751,551 | 5/1998 | Hileman et al. ......................... 248/634 |

*Primary Examiner*—Ramon O. Ramirez
*Assistant Examiner*—Jerome DeLuca
*Attorney, Agent, or Firm*—Jonathan E. Olson; Shawn B. Dempster; Edward P. Heller, III

[57] ABSTRACT

Apparatus and method for mounting a disc drive with vertical and horizontal compressible elements and for stabilizing the disc drive during use. Shock mounts are affixed to a horizontal surface (i.e. parallel to a data surface) of the disc drive, slowing vertical shock pulses transmitted from the frame to the disc drive. Recessed vertical surfaces are formed on sides of the housing to accommodate additional dampeners, which slow horizontal shock pulses while reducing operating vibration.

18 Claims, 2 Drawing Sheets

MOUNTING FRAME USING AN OPERATING VIBRATION DAMPER AT A RECESSED SIDE SURFACE OF A DISC DRIVE HOUSING

REFERENCE TO CO-PENDING APPLICATION

Divisional of U.S. patent application Ser. No. 09/086,357 filed May 28, 1998.

BACKGROUND OF THE INVENTION

This is an original patent application of provisional application Ser. No. 60/064,818 filed Nov. 7, 1997.

This invention relates generally to disc drive data storage devices and more particularly, it relates to a head disc drive assembly damper configuration for use with a disc storage device designed with shock mounts so as to compensate for reduced rigidity.

As is generally well-known in the art, disc drive data storage devices are used in modern microcomputers such as personal computers and the like. One type of such devices known in the industry is referred to as a "Winchester" disc drive in which one or more rotatably driven memory storage discs are mounted within a substantially sealed disc drive assembly along with a corresponding electromagnetic transducer carried in a slider body. The slider body has a self-acting hydrodynamic air bearing which "flies" the transducer a very small distance above the surface of the disc. In this fashion, digital data is recorded on (writing) and retrieved from (reading) from a thin layer of magnetizable material on the surface of the spinning disc.

The slide/transducer subassembly is typically referred to as a "head" and a single head is generally associated with each disc surface. The heads are controlled by electronic circuitry for selectively moving them to any one of a plurality of circular, concentric data tracks on the disc surface by an actuator device. Further, the head disc assembly is mounted onto a rigid frame or chassis for connection to an external apparatus such as a personal computer. In addition, in order to meet high non-operating shock requirements, such as greater than 200 Gs (2 ms pulse) shock absorbers or shock mounts are suitably affixed to the head disc assembly for supporting the same from the rigid chassis. Such prior art shock mounts, as shown in FIG. 1, are used to isolate the disc and corresponding heads from undesired shocks and vibrations in the vertical or Z-direction which might cause tracking errors during the course of reading and writing data.

It is also generally known that past disc drives of this above-discussed type were manufactured in the 5¼ inch form factor where the data tracks are distributed on the surfaces of the disc at a radial track density of 300–400 tracks per inch (TPI) and the heads were located approximately 12–14 microinch above the disc surfaces. In view of recent trends for smaller form factors and increased data storage capacity, there have been produced disc drives with track density in the range between 1800 and 10,000 TPI and head dimensions between 1.0–4.0 microinch above the disc surfaces. Currently, disc drives are being manufactured in the 3½ inch and smaller form factors. Thus, due to the ever increasing trends for higher number of tracks per inch, the disc drives being manufactured can no longer meet the operating vibration requirement in the X-Y plane with the existing shock mounts.

Therefore, it would be desirable to provide a head disc drive assembly damper for use with a disc storage device designed with shock mounts so as to improve the operating vibration in the X-Y plane. Further, it would be expedient to improve the servo tracking ability during low frequency operating vibration but yet maintain the non-op shock absorption characteristics of the shock mounts.

SUMMARY OF THE INVENTION

Accordingly, it is a general object of the present invention to provide a head disc drive assembly damper configuration which is relatively simple in its construction and is easy to manufacture and assemble.

It is an object of the present invention to provide a head disc drive assembly damper for use with a disc storage device designed with shock mounts so as to compensate for reduced rigidity.

In accordance with a preferred embodiment of the present invention there is provided a damper for use in a head disc drive assembly so as to improve servo tracking during low frequency operating vibration. The drive assembly includes shock mounts secured thereto for compressing vibrations and shocks in a vertical direction. A frame includes a plurality of vertical extensions formed on one of its sidewalls. A dampening element is fixedly secured to the interior surface of each of the plurality of vertical extensions so as to dampen vibrations of the drive assembly in an X-Y plane disposed perpendicularly to the vertical direction. The disc drive assemble includes openings for receiving therein the corresponding dampening element.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
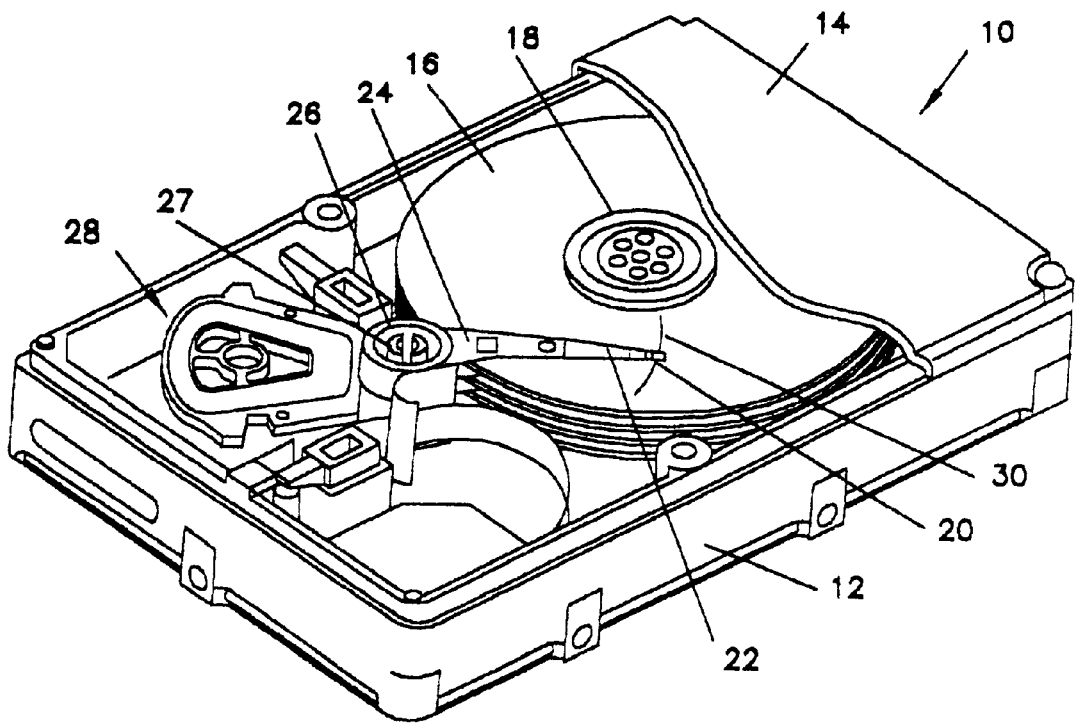
FIG. 1 is a perspective view, partly cut away, of a head disc drive assembly to which the tamper of the present invention is particularly useful.

Referring now in detail to the drawings, there is shown in FIG. 1 a head disc drive assembly 10 of the type to which a damper of the present invention can be particularly applied. The head disc drive assembly 10 includes a sealed enclosure formed of a rectangularly-shaped base member 12 and a top cover 14. The top cover 14 is partly broken away so as to provide a view of the components housed within the enclosure.

The base member 12 has housed therein at least one disc 16 mounted for rotation on a spindle motor (not shown) and held in place by a disc clamp 18. At least one read/write head 20 is mounted via a flexure assembly 22 to a head mounting arm 24 formed integrally with an actuator body 26. The actuator body 26 is adapted to pivot about a shaft 27 when driven by an actuator motor 28. As a consequence, the head 20 is moved controllably back and forth along the arcuate path 30 to a desired one of a plurality of circular, concentric data tracks (not shown) on the surface of the disc 16.

Figure 2:
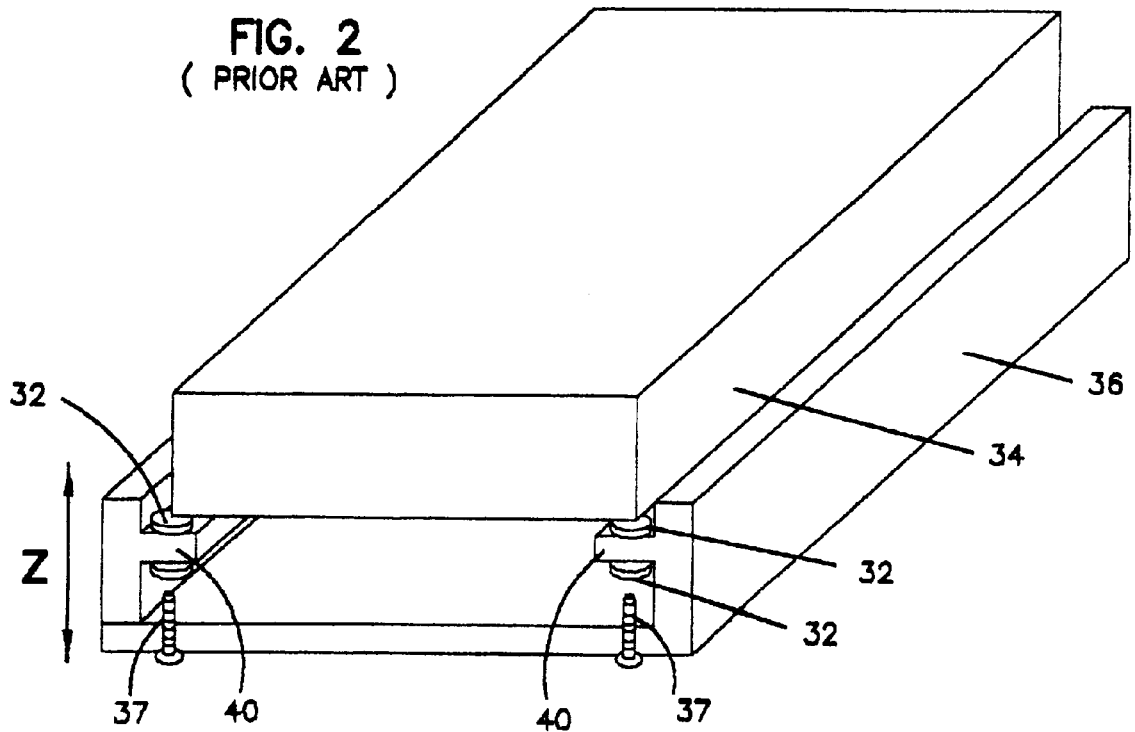
FIG. 2 is a perspective view of the head disc drive assembly of FIG. 1 designed with shock mounts for supporting the head disc drive assembly from a rigid chassis.

As previously pointed out, in order to meet the high non-operating shock requirements such as greater than 200 Gs (2 ms pulse), shock absorbers or shock mounts are provided for resiliently supporting the head disc drive assembly housing relative to a rigid frame or chassis. Typically, such shock mounts are disposed at each of the four corners of the head disc drive housing which are used to absorb the energy during impact. In FIG. 2 of the drawings, there is illustrated pairs of shock mounts 32 provided at the four corners (two being shown) of the housing 34 so as to support the same relative to a rigid mounting frame 36. It should be clearly understood by those skilled in the art that the frame 36 is adapted for simple securement to the housing 34 by means of a plurality of screws 37 or the like.

The shock mounts 32 are preferably made of a resilient cylindrically-shaped buffer member disposed on each side of horizontal flanges 40 extending inwardly from the upper portion of opposed interior vertical walls of the mounting frame 36. The shock mounts 32 are designed to compress in the vertical of Z-direction during shock. Therefore, they function to absorb and dissipate the impact energy over time so as to protect the head disc drive assembly housing 34 from damage caused by mechanical shock and vibration. Nevertheless, in such application, the use of the shock mounts 32 weakens the rigidity of the head disc drive assembly housing 34 relative to the rigid frame 36 in the X-Y plane disposed perpendicularly to the Z-axis.

Moreover, this reduced rigidity will degrade servo tracking ability when the disc drive is being subjected to a low frequency vibration in the X-Y plane which is sometimes known as "operating vibration." As a result, the degraded performance will cause reading and/or writing errors due to shift between the head and the storage disc, even at vibration levels as low as 0.4 Gs in the frequency range of 22 Hz to 350 Hz.

Also, due to the smaller form factor requirement as demanded by application users, there is normally needed a very tight spacing between the head disc drive assembly housing and the rigid chassis. Since both the head assembly and the frame are typically formed of a metallic material such as aluminum or stainless steel there will be caused metal-to-metal contact between the drive assembly 34 and the frame 36 during high level operating vibration due to the lessened rigidity. Consequently, such physical contact will impose stress and possibly damage to the drive assembly as well as generating reading and/or writing errors.

Figure 3:
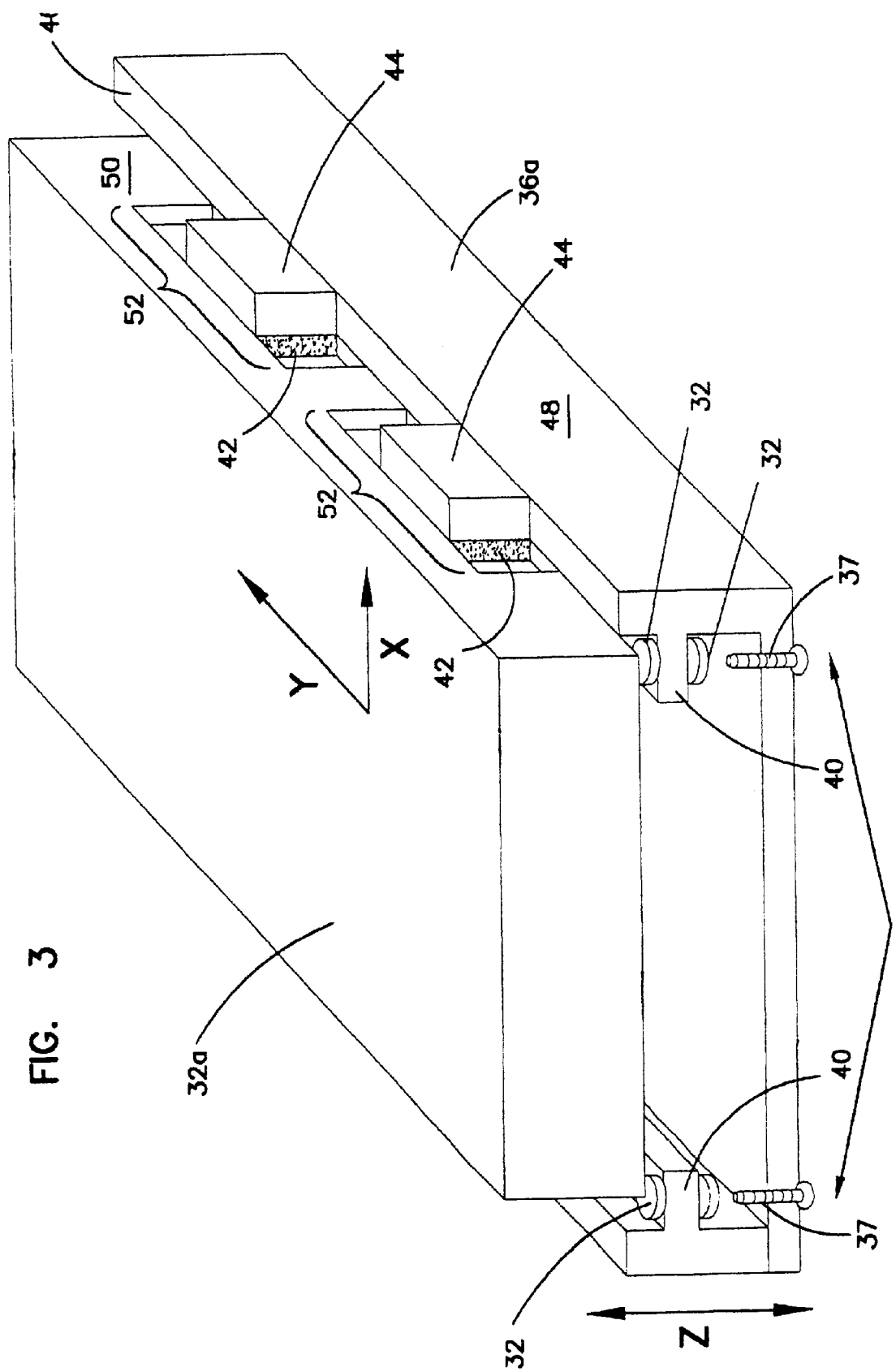
FIG. 3 is a perspective view, similar to FIG. 2, but incorporating the head disc drive assembly damper, constructed in accordance with the principles of the present invention.

The inventors of the present invention have developed a head disc drive assembly damper 42, as shown in FIG. 3, for use with disc drives designed with the shock mounts 32 of FIG. 2 so as to overcome the problem of reduced rigidity caused by the application of such shock mounts. The head disc drive assembly damper functions to absorb the energy transmitted from the head disc assembly housing to the rigid frame during operating vibration in the X-Y plane as well as to increase the rigidity of the head disc assembly housing relative to the frame.

Referring now in particular to FIG. 3, there is shown in detail a plurality of head disc drive assembly dampers or dampening elements 42 each formed of a rectangularly-shaped elastic or viscoelastic material suitable for producing an adequate cushioning effect in order to decrease or eliminate physical contact engagement between the head disc drive assembly housing and the frame caused by operating vibration in the X-Y direction, as indicated by the arrows. The dampers 42 are preferably formed of a rubber element. As can best be seen, the frame 36a has been modified from FIG. 2 so as to include a plurality of vertical extensions 44 projecting upwardly from a top surface 46 on one of the sidewalls 48 thereof. Each of the vertical extensions 44 is substantially rectangular in shape which are dimensioned so as to accommodate for attachment with the damper 42. The dampers are preferably fixedly secured to the interior surface of the vertical extensions 44 by application of an adhesive material such as glue or the like.

In addition, in order to accommodate for the dampers 42, the sidewall 50 of the head disc drive assembly housing 34a is formed with a pair of inverted U-shaped slots 52 which are aligned with the corresponding vertical extensions 44 so as to be receivable therein the associated dampers. The U-shaped slots were used to accommodate the damper facing inward so as not to exceed the overall drive form factor. It should be appreciated that due to the elastic nature of the dampers 42 and their unique mounting relationship between the drive assembly housing 34a and the frame 36a the shock absorption characteristics of the shock mounts 32 in the vertical (Z) direction has been retained and is not adversely affected. Further, the robustness of the disc drive housing 34a has been improved against rotational shock and rotational vibration. As a result, the servo tracking ability during low frequency vibration of the head will be increased in the course of reading and writing of data, thereby preventing read/write errors as well as maintaining the shock requirements utilizing the shock mounts.

For completeness in disclosure of the above discussed head disc drive assembly damper but not for purposes of limitation, the following representative values for the non-operating shock and operating vibration tests are submitted in the Table listed below. The values were obtained from a prototype with the dampers 42 of the present invention as disclosed which was constructed and tested to show the effectiveness for different mounting configurations. As can be seen, the dampers 42 of the present invention increase the operating vibration threshold of the disc drive from 0.4 Gs to 2.0 Gs in the frequency range of 22–350 Hz, but yet without degrading the vertical shock absorption characteristics of the shock mounts.

TABLE

| | TYPE OF SHOCK MOUNTING CONFIGURATION | | |
|---|---|---|---|
| TESTS DESCRIPTION | No Shock Mount | With Shock Mount | With HDA Damper |
| Operating Vibration (OV) Threshold for freq. range 22 Hz–350 Hz. | 1.7 Gs pk | 0.4 Gs pk | 2.0 Gs pk |
| Non-operating Shock (2 msec pulse width) | Failed post-test after 140 Gs, 2 ms. | Failed post-test after 220 Gs, 2 ms. | Failed post-test after 220 Gs, 2 ms. |

From the foregoing detailed description, it can thus be seen that the present invention provides a damper for use in a head disc drive assembly so as to improve servo tracking during low frequency operating vibration. A dampening element is fixedly secured to the interior surface of each of the vertical extensions of the frame so as to dampen vibration of the drive assembly in an X-Y plane disposed perpendicularly to the vertical direction. The disc drive assembly is provided with openings for receiving therein the corresponding dampening elements.

What is claimed is:

1. A support structure suitable for use in a computer, comprising:
    a frame;
    a disc drive including a housing and including a data surface defining a horizontal reference plane, the housing having a side with a first vertical surface recessed therefrom; and
    several resilient elements each in contact with the disc drive and with the housing, a first subset of the resilient elements being shock mounts compressible enough to slow a vertical shock pulse passing from the frame to the disc drive, a first selected one of the resilient elements other than the subset being in contact with the first recessed vertical surface and being configured to avoid interfering with the shock-induced compression.

2. The support structure of claim 1 in which the mounting frame has a slot about as wide as the disc drive in a horizontal direction.

3. The support structure of claim 1 in which the first selected resilient element is attached to the mounting frame but not attached to the housing.

4. The support structure of claim 1 in which the shock mounts are compressible enough to prevent damage to the disc drive receiving a vertical shock of 200 G's during a period of non-operation.

5. The support structure of claim 1 in which the side of the housing has a second vertical surface recessed therefrom, in which a second selected one of the resilient elements other than the subset is in contact with the second recessed vertical surface, and in which the selected resilient elements are each in a position to reduce rotational vibration.

6. The support structure of claim 1 in which each resilient element of the first subset has a horizontal surface configured to bear variably against the housing to dampen vertical vibration.

7. The support structure of claim 1 in which the housing has several vertical surfaces including the recessed vertical surface, in which a second subset of the resilient elements each contacts the housing only at a respective one of the several vertical surfaces, the second subset including the first selected resilient element.

8. The support structure of claim 7 in which each resilient element of the second subset has a vertical surface configured to bear variably against the housing to dampen horizontal vibration.

9. The support structure of claim 7 in which the second subset are sufficiently thick to prevent physical contact between the disc drive and the frame during an operating vibration of a predetermined magnitude.

10. The support structure of claim 9 in which the predetermined magnitude of vibration corresponds to a series of several accelerations of the disc drive each of about 2.0 G's.

11. The support structure of claim 1 in which the first selected element is stiff enough so that data on a track of the data surface can be read in the presence of a specified level of operating vibration.

12. The support structure of claim 1 in which the frame has a slot about as wide as the disc drive, in which the side of the housing also has a second vertical surface recessed therefrom, in which the several resilient elements are thick enough to prevent collision between the disc drive and the frame during an operating vibration having several 2.0 G accelerations, the first subset of the resilient elements being compressible enough to slow a predetermined vertical shock pulse passing from the frame to the disc drive enough to prevent damage to the disc drive during a period of non-operation, the resilient elements not in the first subset including a second subset, the second subset including the first selected element and a second selected element, the first and second selected elements being attached to the mounting frame and in respective contact with the first and second recessed vertical surfaces each in a position to dampen a rotational vibration of the housing, each element of the second subset being stiff enough to allow data on a track of the data surface to be read in the presence of the operating vibration, each element of the second subset in a position to avoid interfering with the shock-induced compression of the first subset of elements.

13. The support structure of claim 1 in which the several resilient elements contain an outgassing ingredient and the disc drive is sealed to prevent the outgassing ingredient from entering the disc drive.

14. A method of using the support structure of claim 1 comprising a step of:
    operating the disc drive to cause an operating vibration that is small enough to allow reading data from the data surface and to avoid collision between the disc drive and the frame.

15. A method of making the support structure of claim 1 comprising a step of:
    assembling the several resilient elements between the mounting frame and the disc drive so that any vertical shock pulses passing from the frame to the disc drive will be slowed by a compression of each resilient element in the first subset and so that the first selected resilient element avoids interference with the shock induced compression.

16. A method of using the support structure made according to claim 15 further comprising a step of:
    operating the disc drive to cause an operating vibration that is small enough to allow reading data from the data surface and to avoid collision between the disc drive and the frame.

17. In a system including a frame and a disc drive having a data surface defining an X-Y plane and a vertical direction perpendicular thereto, and in which the disc drive and a slot of the frame each define a width in the X-direction, a method of stabilizing the disc drive comprising steps of:
    (a) forming a first recessed vertical surface on a side of a housing of the disc drive;
    (b) positioning several elastomeric elements each in contact with the housing and with the frame so that a selected one of the elements contacts the first recessed surface;
    (c) affixing several of the elastomaric elements other than the selected one to a horizontal surface of the housing so as to mount the disc drive into the frame;
    (d) displacing the housing by operating the disc drive; and
    (e) compensating for the operation-induced displacement by compressing at least one of the elastomeric elements.

18. A support structure suitable for use in a computer, comprising:
    a mounting frame having a limited-width slot;

a disc drive including a housing about as wide as the slot and including a data surface defining a horizontal reference plane, the housing having a side with first and second vertical surfaces recessed therefrom; and several resilient elements each in contact with the disc drive and with the housing, the resilient elements sufficiently thick to prevent physical contact between the disc drive and the frame during an operating vibration of a predetermined magnitude corresponding to a series of several accelerations of the disc drive of about 2.0 G's, the several resilient elements comprising:

a first subset of the resilient elements being shock mounts compressible enough to slow a 200 G vertical shock pulse passing from the frame to the disc drive enough to prevent damage to the disc drive during a period of non-operation, and a second subset of the resilient elements disjointed from the first subset, first and second selected ones of the second subset being attached to the mounting frame and in respective contact with the first and second recessed vertical surfaces each in a position to dampen a rotational vibration of the housing, each element of the second subset being configured to avoid interfering with the shock-induced compression of the first subset of elements yet stiff enough so that data on a track of the data surface can be read in the presence of the operating vibration.

\* \* \* \* \*